(12) United States Patent
Yao et al.

(10) Patent No.: US 7,474,512 B2
(45) Date of Patent: Jan. 6, 2009

(54) MIRO-ACTUATOR, HEAD GIMBAL ASSEMBLY, AND DISK DRIVE UNIT WITH THE SAME

(75) Inventors: MingGao Yao, DongGuan (CN); Masashi Shiraishi, HongKong (CN); YiRu Xie, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 414 days.

(21) Appl. No.: 11/300,339

(22) Filed: Dec. 15, 2005

(65) Prior Publication Data

US 2007/0139823 A1    Jun. 21, 2007

(51) Int. Cl.
   *G11B 5/56* (2006.01)
(52) U.S. Cl. .................................................. 360/294.4
(58) Field of Classification Search .............. 360/294.4; 29/603.03, 603.04
   See application file for complete search history.

(56) References Cited

U.S. PATENT DOCUMENTS

| | | | |
|---|---|---|---|
| 5,299,081 A | | 3/1994 | Hatch et al. |
| 5,611,707 A | | 3/1997 | Meynier |
| 5,636,089 A | | 6/1997 | Jurgenson et al. |
| 5,898,544 A | | 4/1999 | Krinke et al. |
| 6,198,606 B1 | | 3/2001 | Boutaghou et al. |
| 6,523,250 B2 | * | 2/2003 | Erpelding et al. ........ 29/603.04 |
| 6,538,836 B1 | | 3/2003 | Dunfield et al. |
| 6,617,763 B2 | | 9/2003 | Mita et al. |
| 6,624,984 B2 | | 9/2003 | Lewis et al. |
| 6,671,131 B2 | | 12/2003 | Kasajima et al. |
| 6,700,727 B1 | | 3/2004 | Crane et al. |
| 6,700,749 B2 | | 3/2004 | Shiraishi et al. |
| 6,950,266 B1 | | 9/2005 | McCaslin et al. |
| 6,961,221 B1 | * | 11/2005 | Niu et al. ................ 360/294.4 |
| 7,082,670 B2 | * | 8/2006 | Boismier et al. ......... 29/603.06 |
| 2003/0074783 A1 | * | 4/2003 | Boismier et al. ......... 29/603.03 |
| 2003/0147177 A1 | | 8/2003 | Yao et al. |
| 2003/0147181 A1 | | 8/2003 | Shiraishi et al. |
| 2003/0168935 A1 | | 9/2003 | Ogawa et al. |

(Continued)

FOREIGN PATENT DOCUMENTS

JP    2002-74871    3/2002

(Continued)

OTHER PUBLICATIONS

U.S. Appl. No. 11/238,998, filed Sep. 2005, Yang et al.

(Continued)

*Primary Examiner*—Tianjie Chen
(74) *Attorney, Agent, or Firm*—Nixon & Vanderhye P.C.

(57) ABSTRACT

A micro-actuator for a head gimbal assembly includes a support frame including a bottom support adapted to be connected to a suspension of the head gimbal assembly, a top support adapted to support a slider of the head gimbal assembly, and a leading beam that couples the bottom support and the top support. The leading beam includes weak points or notches that allow the top support to rotate about a rotational axis in use. A first PZT element is mounted between first sides of the top and bottom supports, and a second PZT element is mounted between second sides of the top and bottom supports. The first and second PZT elements are excitable to cause selective rotational movement of the top support about the rotational axis in use.

32 Claims, 13 Drawing Sheets

U.S. PATENT DOCUMENTS

| | | | |
|---|---|---|---|
| 2004/0095686 A1* | 5/2004 | Kuwajima et al. | 360/294.4 |
| 2004/0136117 A1* | 7/2004 | Kuwajima et al. | 360/294.4 |
| 2006/0023338 A1 | 2/2006 | Sharma et al. | |
| 2006/0050442 A1 | 3/2006 | Yao et al. | |
| 2006/0072247 A1 | 4/2006 | Yao et al. | |
| 2006/0077594 A1* | 4/2006 | White et al. | 360/294.4 |
| 2006/0082917 A1 | 4/2006 | Yao et al. | |
| 2006/0098347 A1 | 5/2006 | Yao et al. | |
| 2006/0146449 A1 | 7/2006 | Yao et al. | |
| 2006/0256479 A1* | 11/2006 | Yao et al. | 360/294.4 |
| 2007/0097553 A1* | 5/2007 | Yao | 360/294.4 |
| 2007/0139825 A1* | 6/2007 | Yao et al. | 360/294.4 |
| 2007/0253115 A1* | 11/2007 | Yao et al. | 360/294.4 |

FOREIGN PATENT DOCUMENTS

JP          2002-133803          5/2002

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

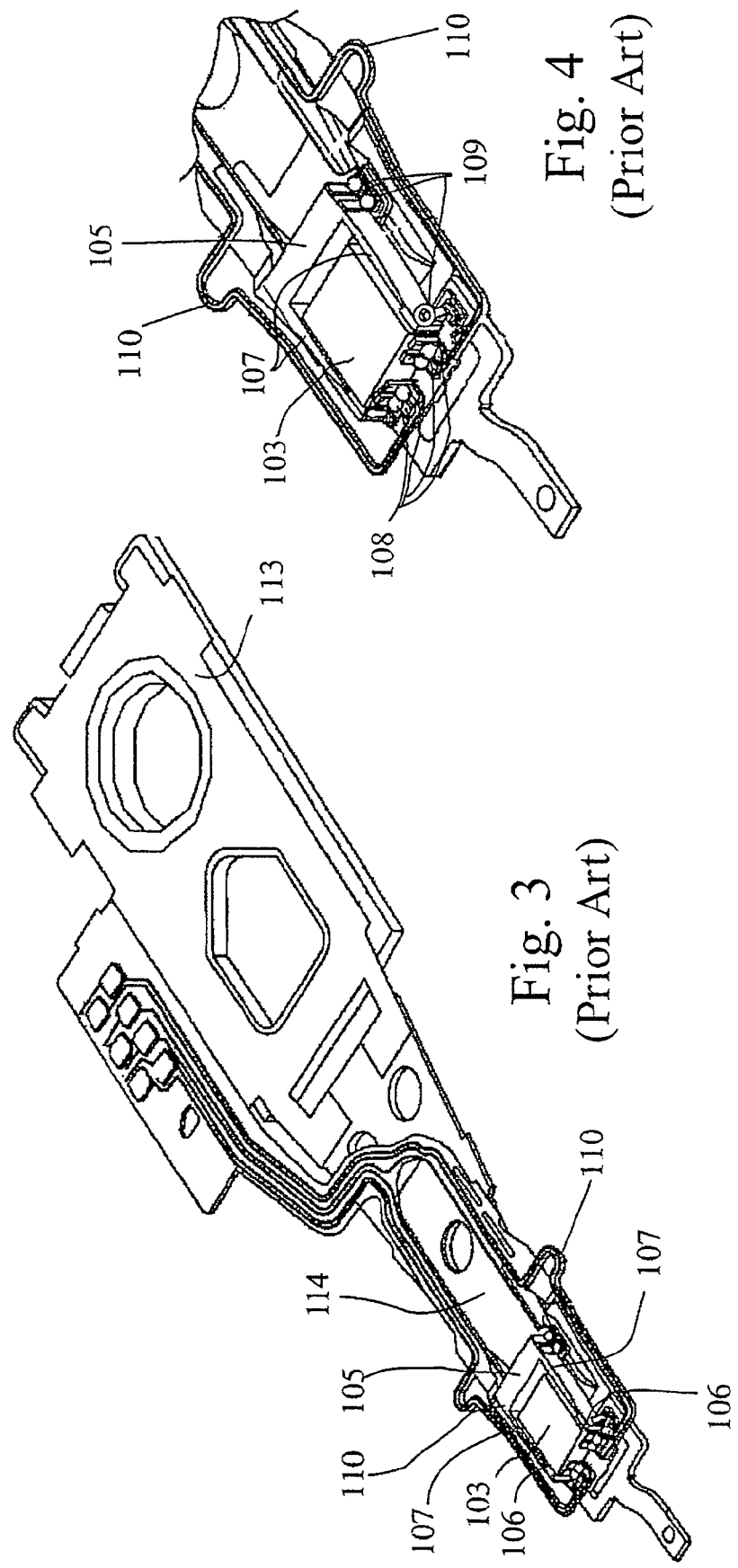

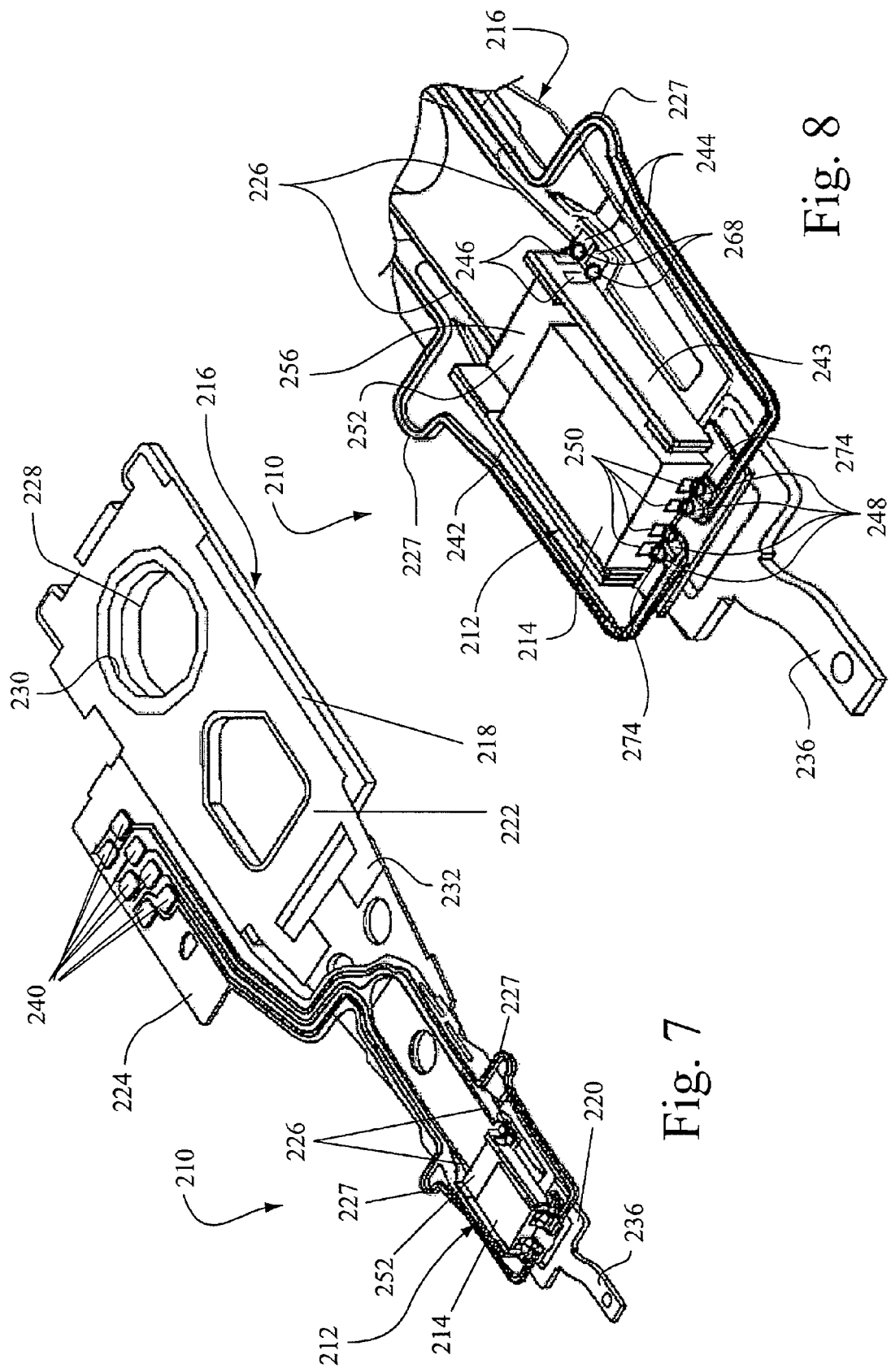

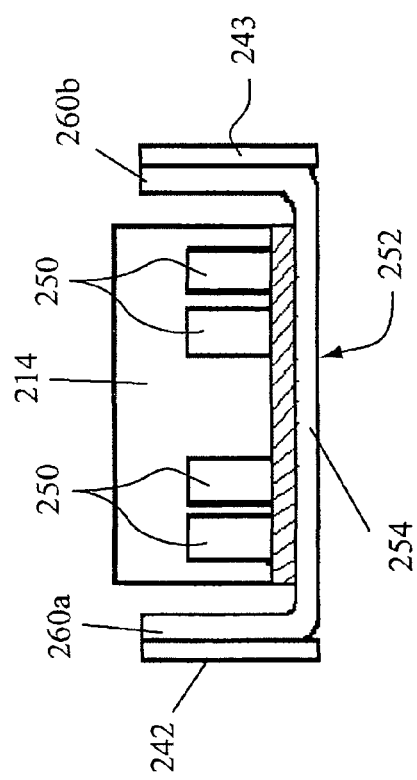
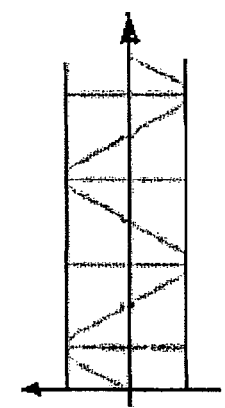
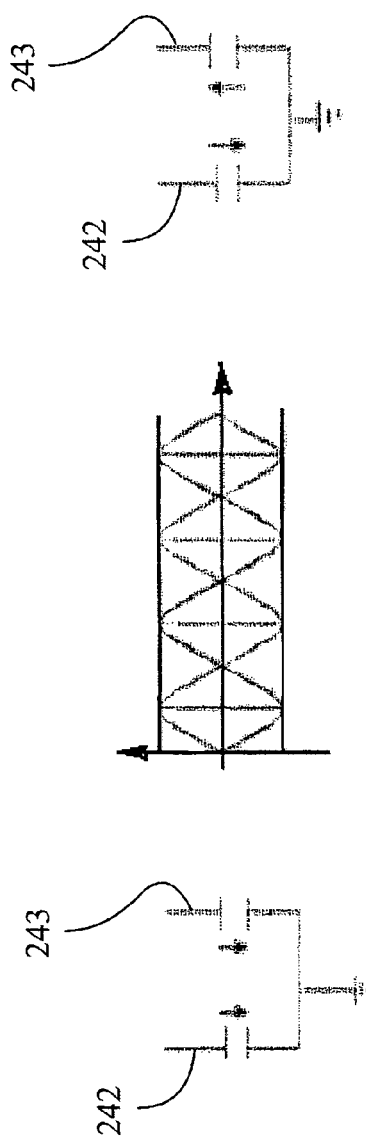
Fig. 12
Fig. 13a
Fig. 13b
Fig. 14a
Fig. 14b

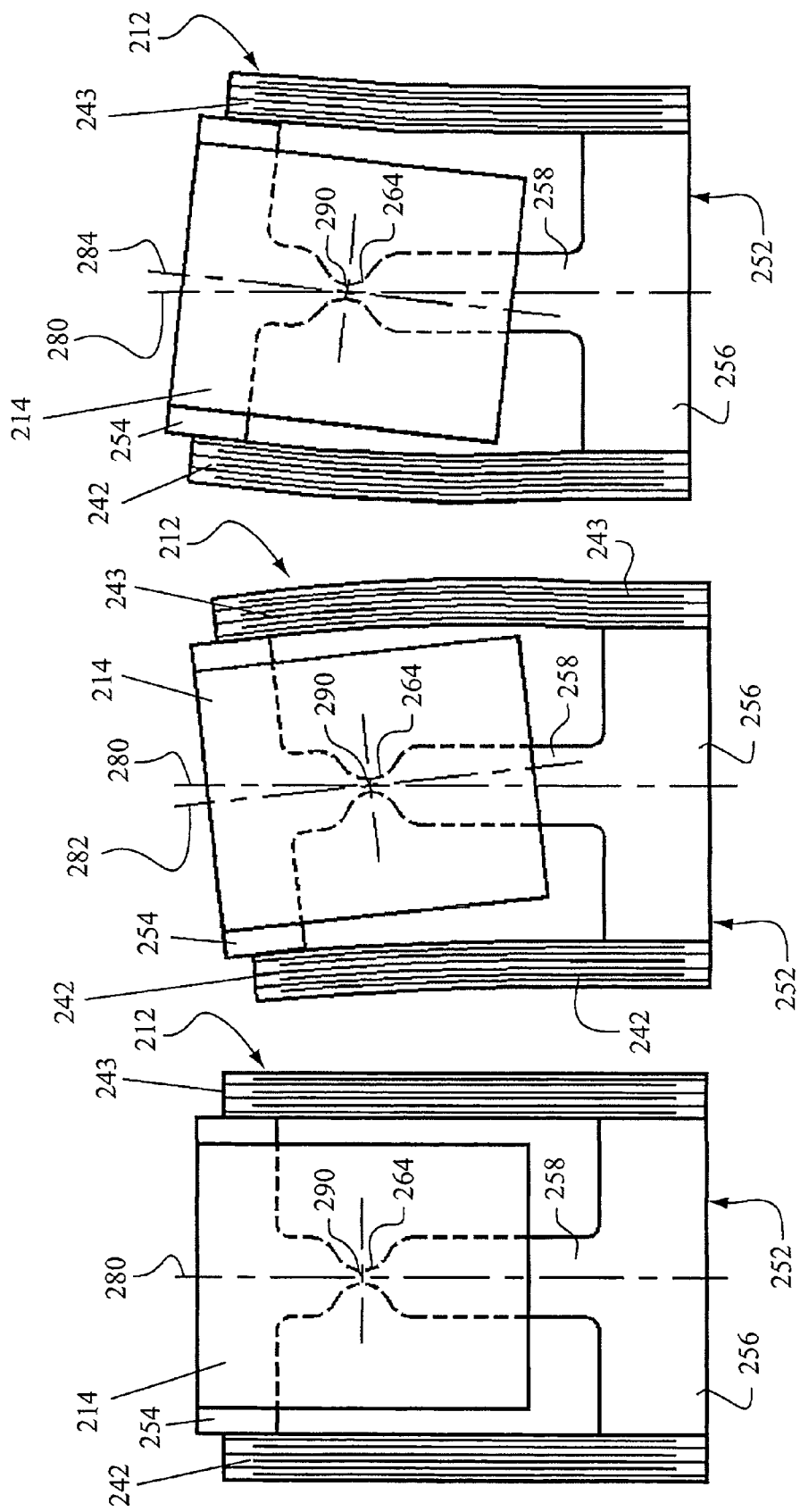

US 7,474,512 B2

MIRO-ACTUATOR, HEAD GIMBAL ASSEMBLY, AND DISK DRIVE UNIT WITH THE SAME

FIELD OF THE INVENTION

The present invention relates to information recording disk drive units and, more particularly, to a micro-actuator for a head gimbal assembly (HGA) of the disk drive unit. More specifically, the present invention is directed to a micro-actuator that is structured to improve resonance performance of the HGA.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly."

FIGS. 1 and 2 illustrate a conventional disk drive unit and show a magnetic disk 101 mounted on a spindle motor 102 for spinning the disk 101. A voice coil motor arm 104 carries a head gimbal assembly (HGA) 100 that includes a micro-actuator 105 with a slider 103 incorporating a read/write head. A voice-coil motor (VCM) 115 is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write head, and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

FIG. 3 illustrates the head gimbal assembly (HGA) 100 of the conventional disk drive device of FIGS. 1-2 incorporating a dual-stage actuator. However, because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and/or head suspension assembly. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

Referring more particularly to FIGS. 3 and 4, a conventional PZT micro-actuator 105 includes a ceramic U-shaped frame which has two ceramic beams or side arms 107 each having a PZT element thereon. The ceramic beams 107 hold the slider 103 therebetween and displace the slider 103 by movement of the ceramic beams 107. The PZT micro-actuator 105 is physically coupled to a flexure 114 of suspension 113. Three electrical connection balls 109 (gold ball bonding or solder ball bonding, GBB or SBB) are provided to couple the micro-actuator 105 to the suspension traces 110 located at the side of each of the ceramic beams 107. In addition, there are four metal balls 108 (GBB or SBB) for coupling the slider 103 to the traces 110.

FIG. 5 generally shows an exemplary process for assembling the slider 103 with the micro-actuator 105. As illustrated, the slider 103 is partially bonded with the two ceramic beams 107 at two predetermined positions 106 (also see FIG. 3) by epoxy 112. This bonding makes the movement of the slider 103 dependent on the movement of the ceramic beams 107 of the micro-actuator 105. A PZT element 116 is attached on each of the ceramic beams 107 of the micro-actuator to enable controlled movement of the slider 103 through excitation of the PZT elements 116. More particularly, when power is supplied through the suspension traces 110, the PZT elements 116 expand or contract to cause the two ceramic beams 107 of the U-shape micro-actuator frame to deform, thereby making the slider 103 move on the track of the disk in order to fine tune the position of the read/write head. In this manner, controlled displacement of slider 103 can be achieved for fine positional tuning.

Because the PZT micro-actuator 105 is mounted on the suspension tongue of the suspension, the PZT micro-actuator 105 moves in a pure translational or sway-like manner when the PZT micro-actuator 105 is excited to sway the slider 103 due to the constraint of the U-shaped frame of the PZT micro-actuator 105. The sway-like motion causes a suspension vibration resonance which has the same frequency as the suspension base plate exciting. The suspension resonance limits the performance characteristics of the disk drive device, e.g., servo bandwidth and the capacity improvement of disk drive device.

For example, FIG. 6 illustrates testing data of the resonance of a prior PZT micro-actuator design. As illustrated, when the PZT micro-actuator is operated (exciting the PZT), a suspension resonance is generated due the relatively large reaction force of the suspension. The curve 160 illustrates a resonance when the suspension base plate is shaken or excited, and the curve 170 illustrates a resonance when the PZT element of the micro-actuator is excited.

Thus, there is a need for an improved system that does not suffer from the above-mentioned drawbacks.

SUMMARY OF THE INVENTION

One aspect of the present invention relates to a micro-actuator structured to provide fine head position adjustment and improved resonance performance of the HGA.

Another aspect of the invention relates to a disk drive unit that provides big servo bandwidth and capacity.

Another aspect of the invention relates to a micro-actuator for a head gimbal assembly. The micro-actuator includes a support frame and first and second PZT elements. The support frame includes a bottom support adapted to be connected to a suspension of the head gimbal assembly, a top support adapted to support a slider of the head gimbal assembly, and a leading beam that couples the bottom support and the top support. The leading beam includes weak points or notches that allow the top support to rotate about a rotational axis in use. The first PZT element is mounted between first sides of the top and bottom supports, and the second PZT element is mounted between second sides of the top and bottom supports. The first and second PZT elements are excitable to cause selective rotational movement of the top support about the rotational axis in use.

Another aspect of the invention relates to a head gimbal assembly including a micro-actuator, a slider, and a suspension that supports the micro-actuator and the slider. The micro-actuator includes a support frame and first and second PZT elements. The support frame includes a bottom support connected to the suspension, a top support that supports the slider, and a leading beam that couples the bottom support and the top support. The leading beam includes weak points or notches that allow the top support to rotate about a rotational axis in use. The first PZT element is mounted between first sides of the top and bottom supports, and the second PZT element is mounted between second sides of the top and bottom supports. The first and second PZT elements are excitable to cause selective rotational movement of the top support about the rotational axis in use.

Yet another aspect of the invention relates to a disk drive device. The disk drive device includes a head gimbal assembly, a drive arm connected to the head gimbal assembly, a disk, and a spindle motor operable to spin the disk. The head gimbal assembly includes a micro-actuator, a slider, and a suspension that supports the micro-actuator and slider. The micro-actuator includes a support frame and first and second PZT elements. The support frame includes a bottom support connected to the suspension, a top support that supports the slider, and a leading beam that couples the bottom support and the top support. The leading beam includes weak points or notches that allow the top support to rotate about a rotational axis in use. The first PZT element is mounted between first sides of the top and bottom supports, and the second PZT element is mounted between second sides of the top and bottom supports. The first and second PZT elements are excitable to cause selective rotational movement of the top support about the rotational axis in use.

Still another aspect of the invention relates to a head gimbal assembly including a micro-actuator, a slider, and a suspension including a suspension tongue that supports the micro-actuator and the slider. The micro-actuator includes a support frame and first and second PZT elements. The support frame includes a bottom support connected to the suspension, a top support that supports the slider, and a leading beam that couples the bottom support and the top support. The leading beam includes weak points or notches that allow the top support to rotate about a rotational axis in use. The first PZT element is mounted between first sides of the top and bottom supports, and the second PZT element is mounted between second sides of the top and bottom supports. The first and second PZT elements are excitable to cause selective rotational movement of the top support about the rotational axis in use. The suspension includes a load beam having a dimple that engages the suspension tongue. A center of the slider, the weak points, and the dimple are aligned along a common axis.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3 is a perspective view of a conventional head gimbal assembly (HGA);

FIG. 4 is an enlarged, partial perspective view of the HGA shown in FIG. 3;

FIG. 7 is a perspective view of a head gimbal assembly (HGA) including a PZT micro-actuator according to an embodiment of the present invention;

FIG. 8 is a partial perspective of the HGA shown in FIG. 7;

FIG. 12 is a front view of the PZT micro-actuator and slider shown in FIG. 7 removed from the HGA;

FIG. 13a illustrates an embodiment of the electrical connection structure between PZT elements of the PZT micro-actuator shown in FIG. 7;

FIG. 13b illustrates a voltage applied to the PZT elements of the PZT micro-actuator shown in FIG. 7;

FIG. 14a illustrates another embodiment of the electrical connection structure between PZT elements of the PZT micro-actuator shown in FIG. 7;

FIG. 14b illustrates another voltage applied to the PZT elements of the PZT micro-actuator shown in FIG. 7;

FIG. 15a is a top view of the slider and PZT micro-actuator of the HGA shown in FIG. 7 in a relaxed state;

FIGS. 15b and 15c are top views of the slider and PZT micro-actuator of the HGA shown in FIG. 7 when a voltage is applied;

DETAILED DESCRIPTION OF ILLUSTRATED EMBODIMENTS

Figure 1:
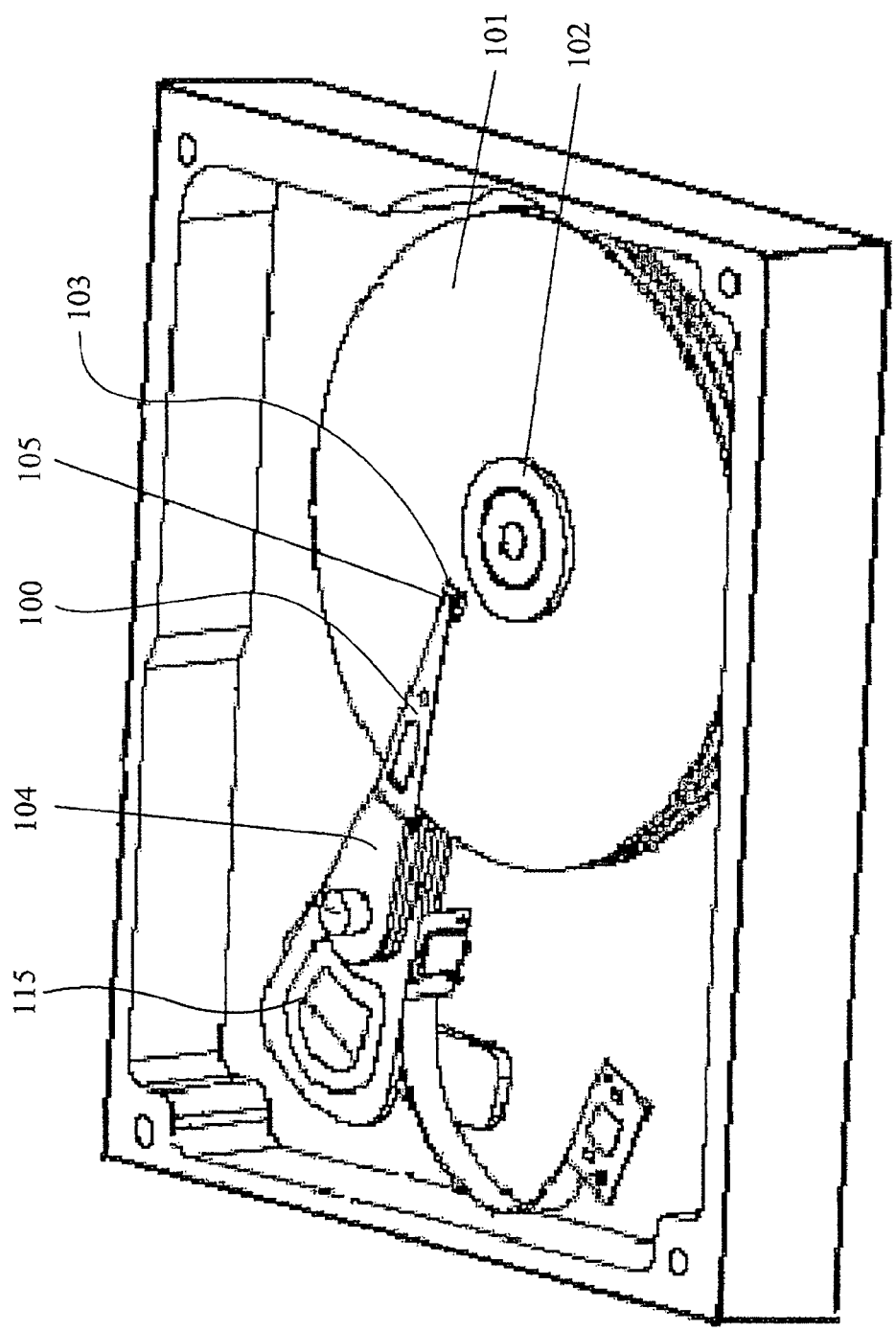
FIG. 1 is a perspective view of a conventional disk drive unit.
Figure 2:
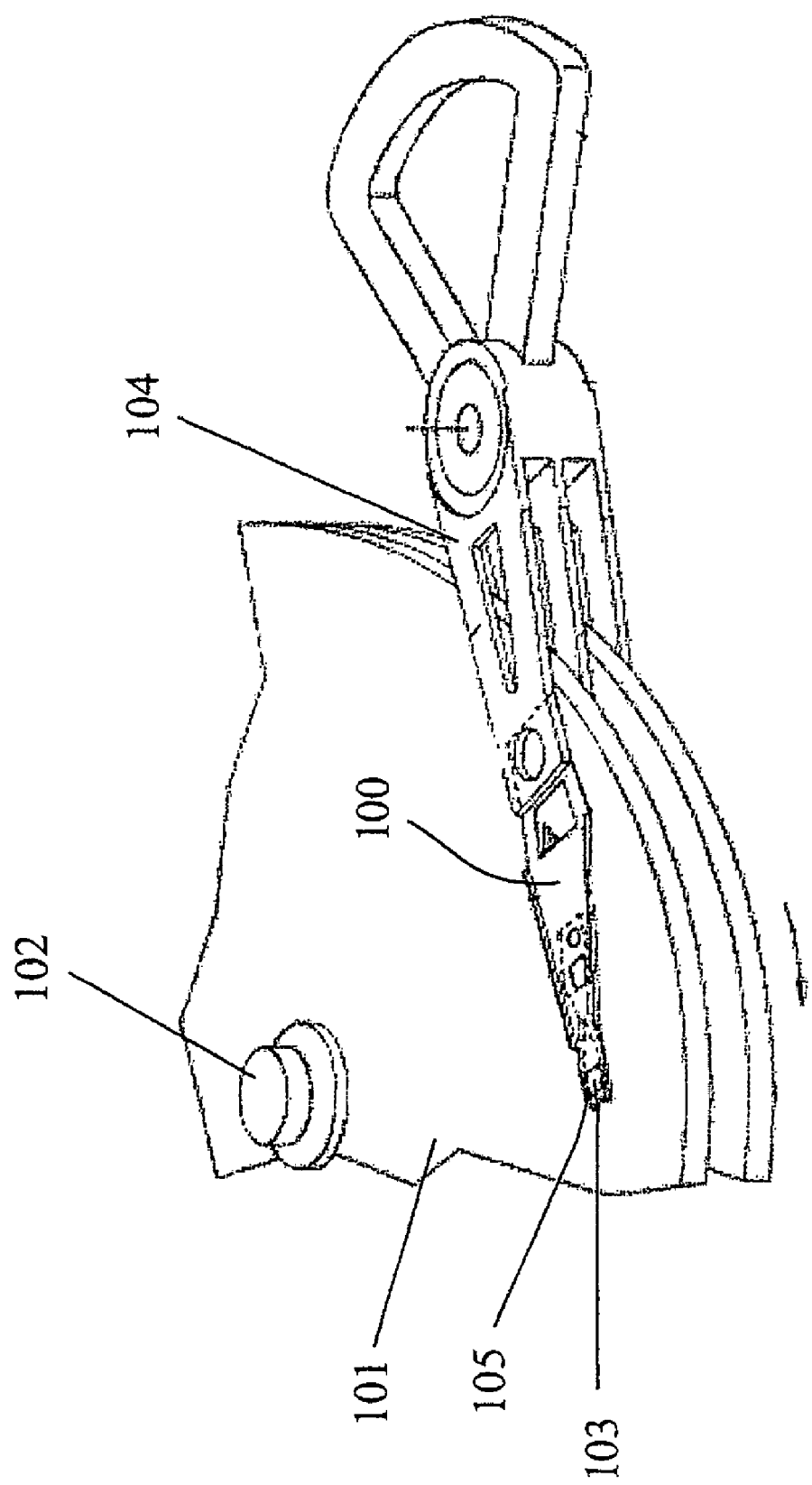
FIG. 2 is a partial perspective view of the conventional disk drive unit shown in FIG. 1.
Figure 5:
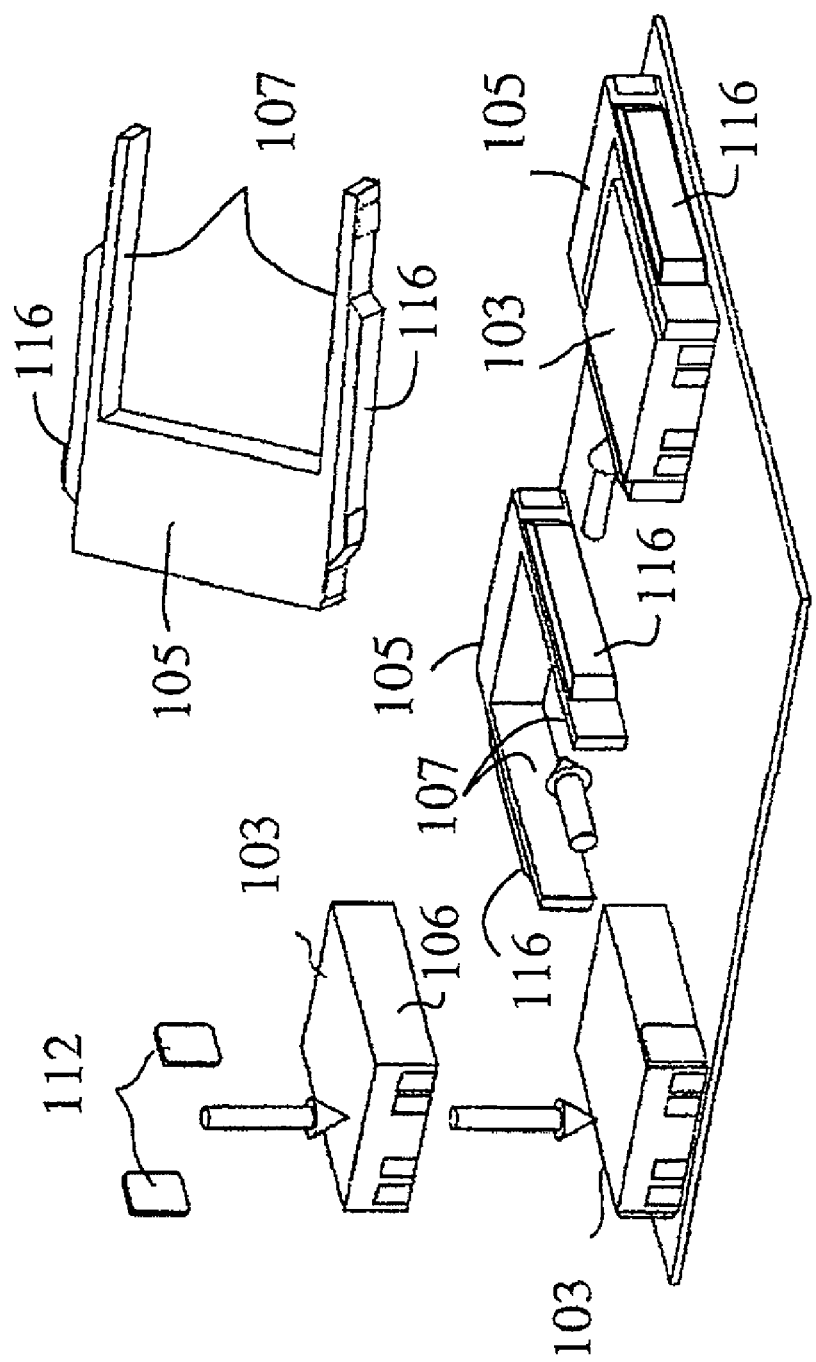
FIG. 5 illustrates a general process of inserting a slider into the micro-actuator of the HGA shown in FIG. 3.

Various preferred embodiments of the instant invention will now be described with reference to the figures, wherein like reference numerals designate similar parts throughout the various views. As indicated above, the instant invention is designed to improve resonance performance in a head gimbal assembly (HGA) while precisely actuating the slider using the micro-actuator. An aspect of the instant invention is to provide a rotation-type PZT micro-actuator configured to improve resonance performance in the HGA. By improving resonance performance of the HGA, the performance characteristics of the disk drive device are improved.

Several example embodiments of a micro-actuator for a HGA will now be described. It is noted that the micro-actuator may be implemented in any suitable disk drive device having a micro-actuator in which it is desired to improve resonance performance, regardless of the specific structure of the HGA as illustrated in the figures. That is, the invention may be used in any suitable device having a micro-actuator in any industry.

FIGS. 7-10 illustrate a head gimbal assembly (HGA) 210 incorporating a PZT micro-actuator 212 according to a first exemplary embodiment of the present invention. The HGA 210 includes a PZT micro-actuator 212, a slider 214, and a suspension 216 to load or suspend the PZT micro-actuator 212 and the slider 214.

As illustrated, the suspension 216 includes a base plate 218, a load beam 220, a hinge 222, a flexure 224, and inner and outer suspension traces 226, 227 in the flexure 224. The base plate 218 includes a mounting hole 228 for use in connecting the suspension 216 to a drive arm of a voice coil motor (VCM) of a disk drive device. The shape of the base plate 218 may vary depending on the configuration or model of the disk drive device. Also, the base plate 218 is constructed of a relatively hard or rigid material, e.g., metal, to stably support the suspension 216 on the drive arm of the VCM.

The hinge 222 is mounted onto the base plate 218 and load beam 220, e.g., by welding. As illustrated, the hinge 222 includes a hole 230 that align with the hole 228 provided in the base plate 218. Also, the hinge 222 includes a holder bar 232 for supporting the load beam 220.

The load beam 220 is mounted onto the holder bar 232 of the hinge 222, e.g., by welding. The load beam 220 has one dimple 234 formed thereon for engaging the flexure 224 (see FIG. 9). An optional lift tab 236 may be provided on the load beam 220 to lift the HGA 210 from the disk when the disk is not rotated.

The flexure 224 is mounted to the hinge 222 and the load beam 220, e.g., by lamination or welding. The flexure 224 provides a suspension tongue 238 to couple the PZT micro-actuator 212 and slider 214 to the suspension 216 (see FIG. 10). The suspension tongue 238 engages the dimple 234 on the load beam 220. As illustrated, the suspension tongue 238 maintains that the loading force is always applied to the center area of the slider 214 through the dimple 234 of the load beam 220. Also, the suspension traces 226, 227 are provided on the flexure 224 to electrically connect a plurality of connection pads 240 (which connect to an external control system) with the slider 214 and the PZT elements 242, 243 on the PZT micro-actuator 212. The suspension traces 226, 227 may be a flexible printed circuit (FPC) and may include any suitable number of lines.

Figures 10, 11:
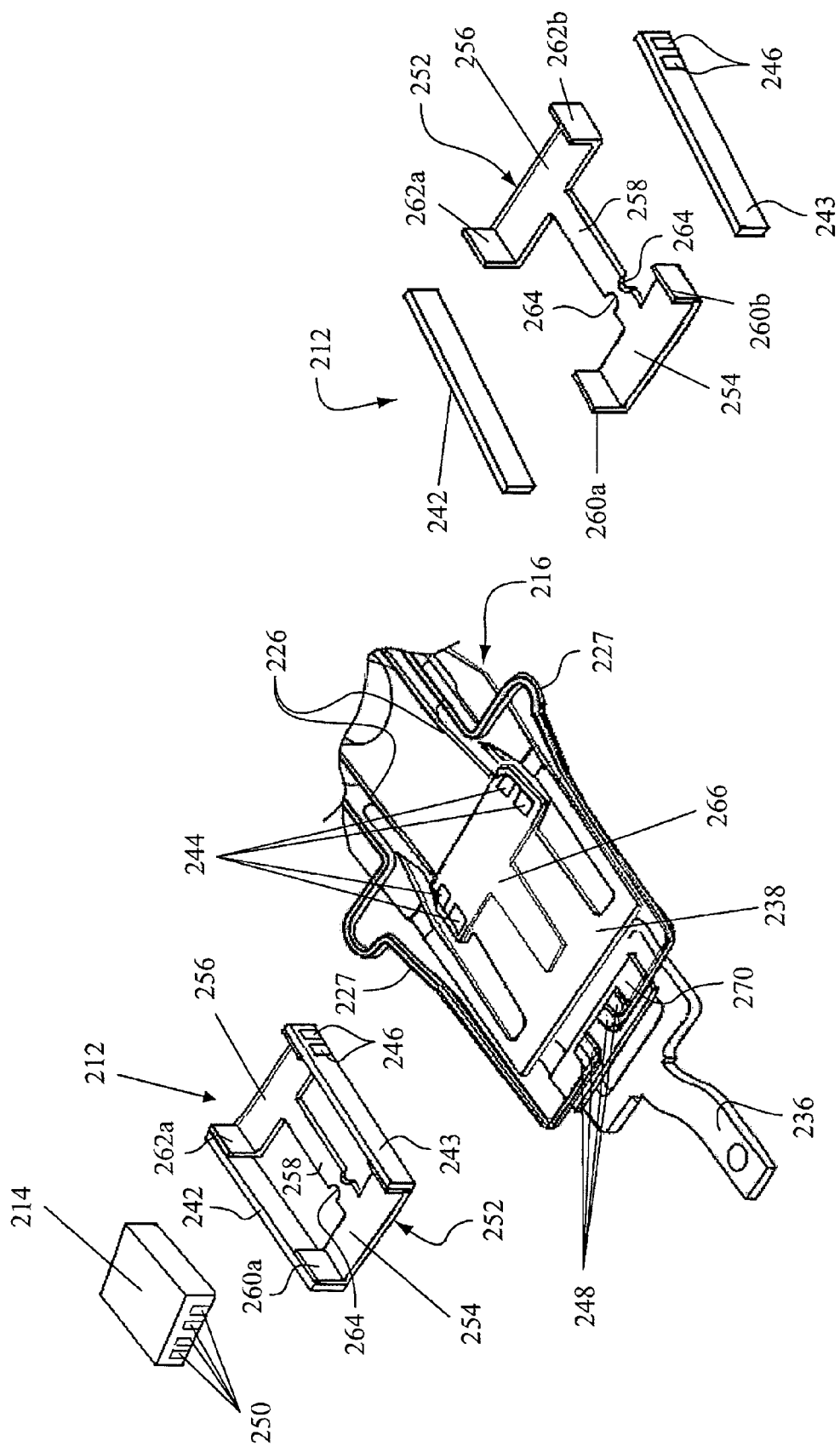
FIG. 10 is an exploded view of the HGA shown in FIG. 8.
FIG. 11 is an exploded view of the PZT micro-actuator shown in FIG. 7 removed from the slider and HGA.

As best shown in FIGS. 8 and 10, bonding pads 244 are directly connected to the inner suspension traces 226 to electrically connect the inner suspension traces 226 with bonding pads 246 provided on the PZT elements 242, 243. Also, bonding pads 248 are directly connected to the outer suspension traces 227 to electrically connect the outer suspension traces 227 with bonding pads 250 provided on the slider 214.

A voice-coil motor (VCM) is provided in the disk drive device for controllably driving the drive arm and, in turn, the HGA 210 in order to enable the HGA 210 to position the slider 214, and associated read/write head, over any desired information track on a disk in the disk drive device. The PZT micro-actuator 212 is provided to enable faster and finer positional control for the device, as well as to reduce the head seeking and settling time during operation. Thus, when the HGA 210 is incorporated into a disk drive device, a dual-stage actuator system is provided in which the VCM actuator provides large positional adjustments and the PZT micro-actuator 212 provides fine positional adjustments for the read/write head.

FIGS. 10-12 illustrate the PZT micro-actuator 212 removed from the suspension 216. As illustrated, the PZT micro-actuator 212 includes a support frame 252 and PZT elements 242, 243 mounted to respective side plates of the frame 252.

The support frame 252 includes a top plate or support 254, a bottom plate or support 256, and a leading beam or connection member 258 that couples the top support 254 to the bottom support 256. The top support 254 includes side plates 260a, 260b on opposing sides thereof and the bottom support 256 includes side plates 262a, 262b on opposing sides thereof. As illustrated, the side plates 260a, 260b, 262a, 262b extend vertically from respective sides of the top and bottom supports 254, 256. Also, weak points or notches 264 are provided in the leading beam 258. When the PZT micro-actuator 212 is mounted to the suspension 216, the weak points 264 are aligned with the dimple 234 of the load beam 220 (see FIG. 9). The support frame 252 may be constructed of metal (e.g., stainless steel), ceramic, or polymer.

The PZT element 242 is mounted between outwardly facing surfaces of the side plates 260a, 262a, and the PZT element 243 is mounted between outwardly facing surfaces of the side plates 260b, 262b. The PZT elements 242, 243 may be mounted to respective side plates 260a, 260b, 262a, 262b by traditional bonding methods such as epoxy bonding, adhesive, or anisotropic conductive film (ACF). Bonding pads 246, e.g., two pads, are provided on the PZT elements 242, 243 for electrically connecting the PZT elements 242, 243 to the inner suspension traces 226. Each PZT element 242, 243 is preferably made of a thin-film PZT material which can have a single-layer structure or a multi-layer structure. However, each PZT element 242, 243 may also be made of a ceramic PZT material which can have a single-layer structure or a multi-layer structure.

Figure 9:
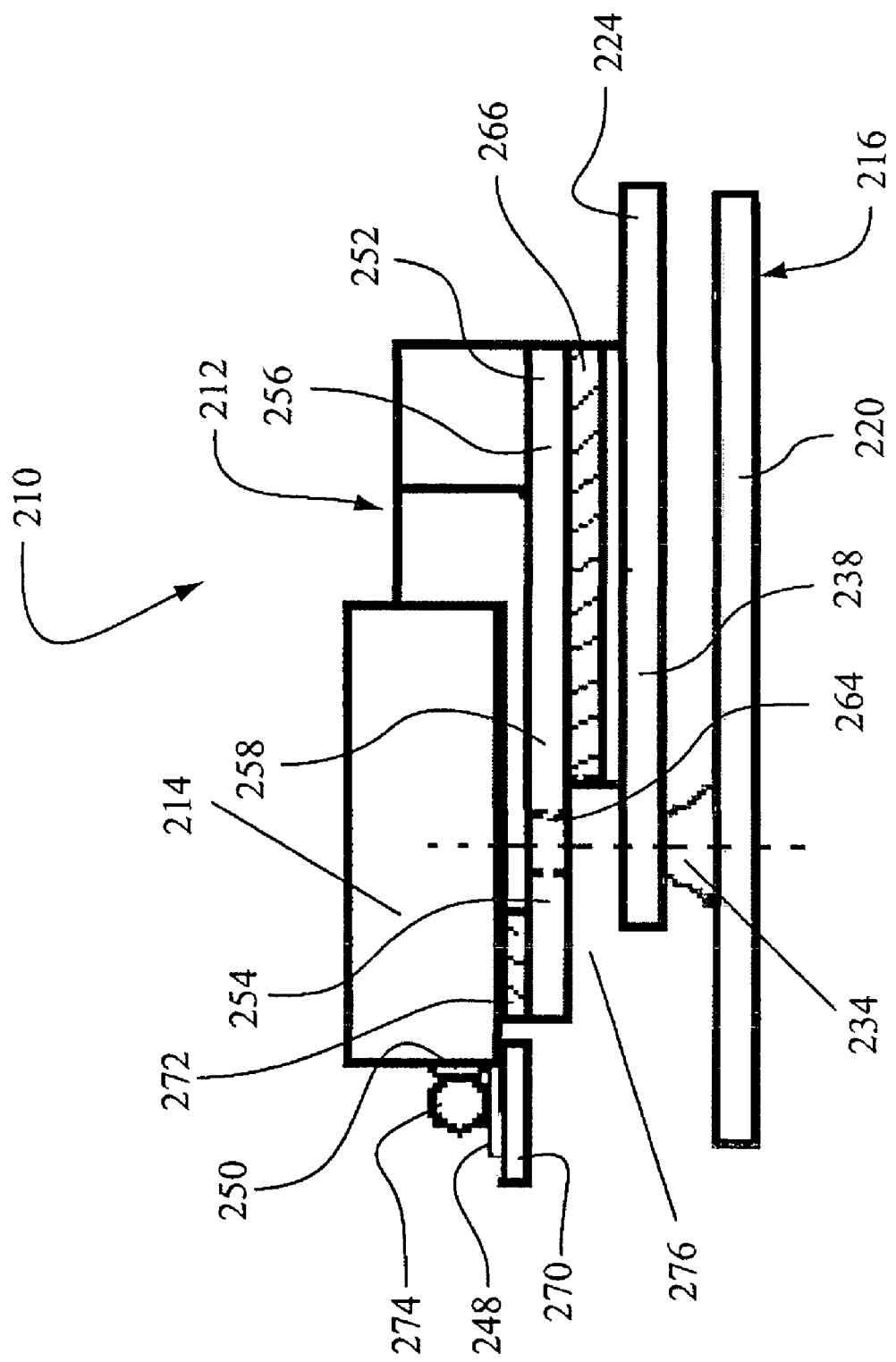
FIG. 9 is a side view of the HGA shown in FIG. 8.

As best shown in FIGS. 8-10, the bottom support 256 is structured to connect the support frame 252 to the suspension 216. Specifically, the suspension tongue 238 includes a T-shaped step 266 constructed of a polymer laminate. The bottom support 256 and a portion of the leading beam 258 are mounted on the T-shaped step 266 such that the weak points 264 of the leading beam 258 are located above and aligned with the dimple 234 of the load beam 220 (see FIG. 9). Also, the PZT bonding pads 246, e.g., two bonding pads, provided on respective PZT elements 242, 243 are electrically connected to respective bonding pads 244 on the inner suspension traces 226 using electrical connection balls (GBB or SBB) 268. This allows power to be applied via the inner suspension traces 226 to the PZT elements 242, 243.

As best shown in FIGS. 8-10 and 12, the top support 254 is structured to connect the support frame 252 to the slider 214. Specifically, the slider 214 has bonding pads 250, e.g., four bonding pads, on an end thereof corresponding to the slider bonding pads 248 provided on a float plate 270. The slider 214 is partially mounted on the top support 254, e.g., by epoxy 272, and the slider bonding pads 248 are electrically bonded with respective pads 250 provided on the slider 214 using, for example, electric connection balls (GBB or SBB) 274. This connects the top support 254 to the slider 214 and electrically connects the slider 214 and its read/write elements to the outer suspension traces 227 on the suspension 216.

As shown in FIG. 9, when assembled, the center of the slider 214 is aligned with the weak points 264 of the leading beam 258, which are aligned with the dimple 234 of the load beam 220. Thus, the center of the slider 214, the weak points 264, and the dimple 234 are located or aligned along a common axis. Also, a parallel gap 276 is provided between the support frame 252 and the suspension tongue 238 to allow the PZT micro-actuator 212 to move freely in use.

In the illustrated embodiment, the slider 214 is mounted to the top support 254 such that the center axis of the slider 214 will substantially align with the center axis of the weak points 264 of the leading beam 258. Also, the bottom support 256 and a portion of the leading beam 258 are mounted on the T-shaped step 266 such that the center axis of the weak points 264 will substantially align with the center axis of the dimple 234 of the load beam 220. This arrangement allows the slider 214 to smoothly rotate around the center axis of dimple 234 when the top support 254 is rotated by exciting the PZT elements 242, 243. The parallel gap 276 allows the top support 254 and slider 214 to rotate smoothly in use.

Since the PZT micro-actuator 212 works by rotating the slider 214 rather than translating the slider, the PZT micro-actuator 212 can be three times as efficient as one that translates the slider. In addition, the PZT micro-actuator provides a pure clear suspension resonance model when operated, which benefits servo bandwidth.

FIGS. 13a, 13b, and 15a-15c illustrate an embodiment of an operation method of the PZT micro-actuator 212 for performing a position adjustment function. Specifically, FIG. 13a illustrates an embodiment of an electrical connection structure between the two PZT elements 242, 243 of the PZT micro-actuator 212, and FIG. 13b illustrates the operation voltage. As illustrated, the PZT elements 242, 243 have the same polarization direction and have a common ground. Also, two different sine voltages are applied to the PZT elements 242, 243 to operate the PZT elements 242, 243. FIG. 15a illustrates the initial stage or original position of the PZT micro-actuator 212 and slider 214 when no voltage is applied to the PZT elements 242, 243 of the PZT micro-actuator 212. As shown in FIG. 15b, when the different phase sine voltages are applied to the PZT elements 242, 243, in the first half period, the PZT element 243 will gradually extend to its longest position or largest displacement position with the voltage increase and then gradually spring back to its original position with the voltage reduction due to the positive phase sine voltage applied. The PZT element 242 will shrink to its shortest position or negative largest displacement position with the voltage increase and then gradually spring back to its original position with the negative voltage reduction due to the negative phase sine voltage applied. This arrangement will cause the PZT micro-actuator 212 to bend towards the left side with the voltage increase and then spring back to its original position when the voltage is reduced. The slider 214 is partially mounted on the top support 254 of the PZT micro-actuator 212 such that the center of the slider 214 is aligned with the weak points 264 and the dimple 234. Also, a parallel gap 276 exists between the leading beam 258 and the suspension tongue 238. This arrangement will generate a rotational torque in use. Therefore, the PZT micro-actuator 212 may rotate the slider 214 about rotational axis 290 from its original position along original axis 280 to its largest displacement position along axis 282, and then back to its original position. As shown in FIG. 15c, when the different phase sine voltages go to the second half period, the PZT element 242 will gradually extend to its largest displacement position with the voltage increase and then gradually spring back to its original position with the voltage reduction. The PZT element 243 will shrink to its shortest position or negative largest displacement position with the voltage increase and then gradually spring back to its original position with the negative voltage reduction due to the negative phase sine voltage applied. This arrangement will cause the PZT micro-actuator 212 to bend towards the right side with the voltage increase and then spring back to its original position when the voltage is reduced. The slider is partially mounted on the top support 254 of the PZT micro-actuator 212 such that the center of the slider 214 is aligned with the weak points 264 and the dimple 234. Also, a parallel gap 276 exists between the leading beam 258 and the suspension tongue 238. This arrangement will generate a rotational torque in use. Therefore, the PZT micro-actuator 212 may rotate the slider 214 about rotational axis 290 from its original position along original axis 280 to its largest displacement position along axis 284, and then back to its original position. Because the slider 214 is rotatable about rotational axis 290 in both directions, a big head displacement and fine head position adjustment may be achieved.

FIGS. 14a and 14b illustrate another embodiment of an operation method of the PZT micro-actuator 212 for performing a position adjustment function. Specifically, FIG. 14a illustrates another embodiment of an electrical connection structure between the two PZT elements 242, 243 of the PZT micro-actuator 212, and FIG. 14b illustrates the operation voltage. As illustrated, the PZT elements 242, 243 have opposite polarization directions and have a common ground. Also, a sine voltage is applied to operate the PZT elements 242, 243. Under the drive of the sine voltage, during the first half period, the PZT element 243 will gradually extend to its largest displacement position and then spring back to its initial position. The PZT element 242 will gradually shrink to its shortest displacement position and then spring back to its initial position. When the sine voltage goes to second half period, the PZT element 242 will gradually extend to its largest displacement position and then spring back to its initial position. The PZT element 243 will gradually shrink to its shortest displacement position and then spring back to its initial position. Similar to the above embodiment, the slider 214 is rotatable about rotational axis 290 to attain fine head position adjustment.

Figure 6:
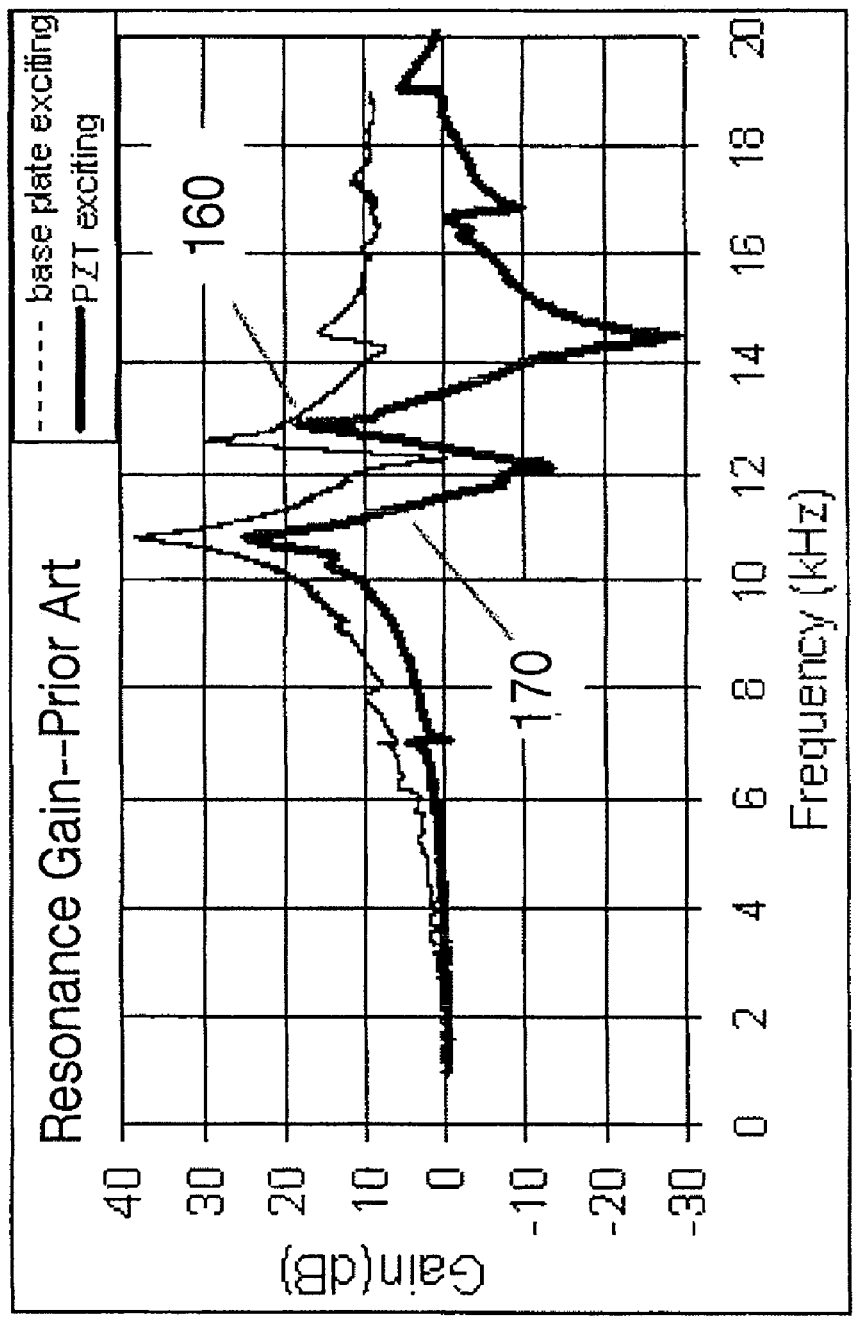
FIG. 6 shows testing data of the resonance of a prior PZT micro-actuator design.
Figure 16:
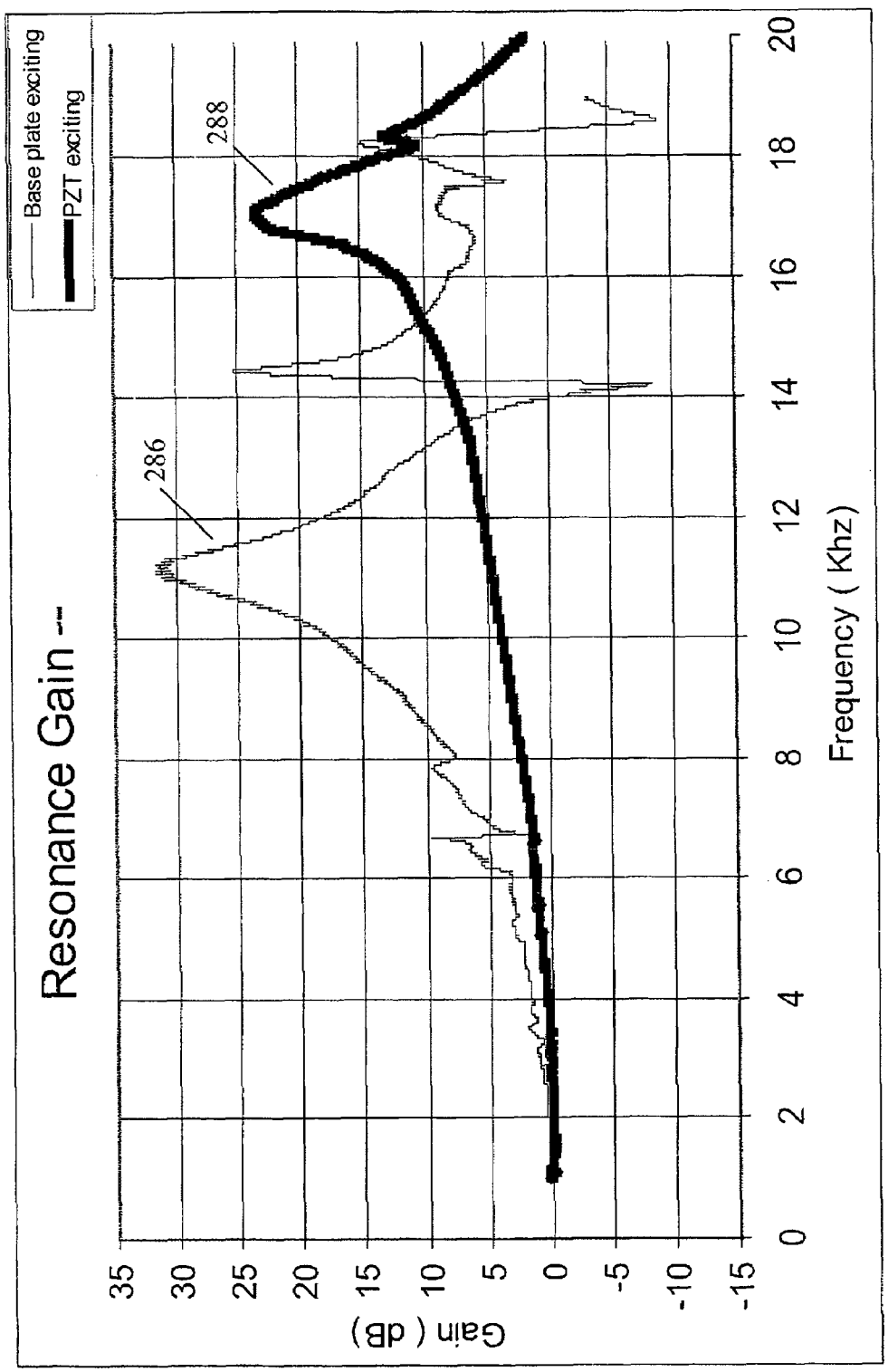
FIG. 16 shows testing data of the resonance of the PZT micro-actuator shown in FIG. 7.

FIG. 16 illustrates resonance testing data of the PZT micro-actuator 212. As illustrated, the curve 286 illustrates the resonance gain when the suspension base plate is shaken or excited, and the curve 288 illustrates the resonance gain when the PZT elements 242, 243 of the PZT micro-actuator 212 are excited. Since the PZT micro-actuator 212 works as a rotation-type rather than a prior sway-type, a relatively small reaction force is applied to the suspension when the PZT micro-actuator 212 is operated. That is, the PZT micro-actuator 212 does not have a suspension resonance model like the prior model represented in FIG. 6. As illustrated, a suspension resonance does not occur in low frequency, and only a pure micro-actuator resonance occurs in high frequency when the PZT micro-actuator is operated. Thus, the PZT micro-actuator 212 greatly improves the performance characteristics of the disk drive device. For example, a large servo bandwidth may be achieved and improve the capacity of the disk drive device and reduce the head seeking and settling time.

Figure 18:
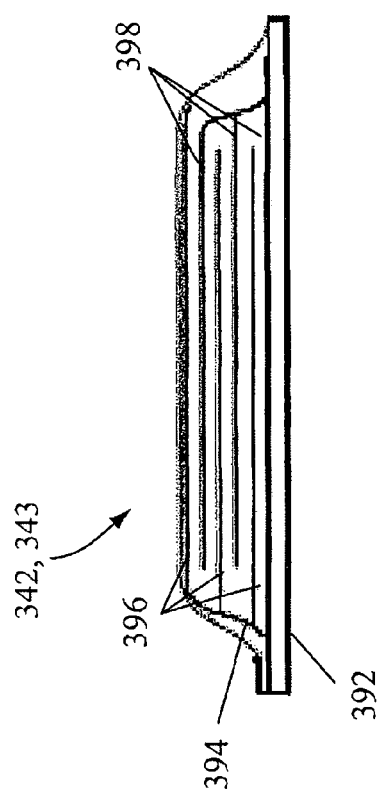
FIG. 18 is a cross-sectional view of an embodiment of a PZT element of the PZT micro-actuator shown in FIG. 17.
Figure 19:
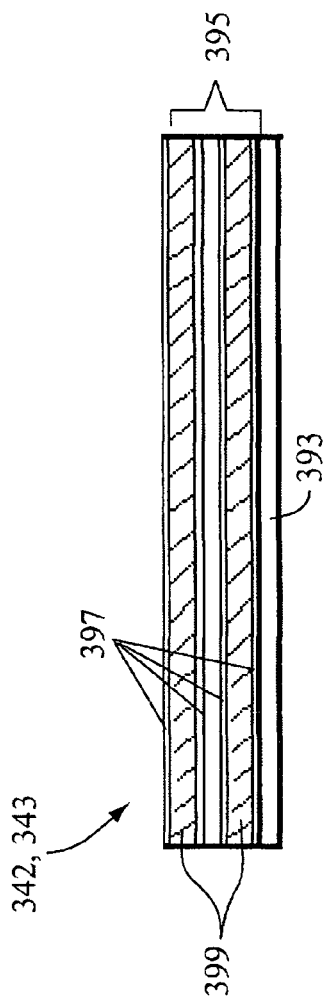
FIG. 19 is a cross-sectional view of another embodiment of a PZT element of the PZT micro-actuator shown in FIG. 17.
Figure 17:
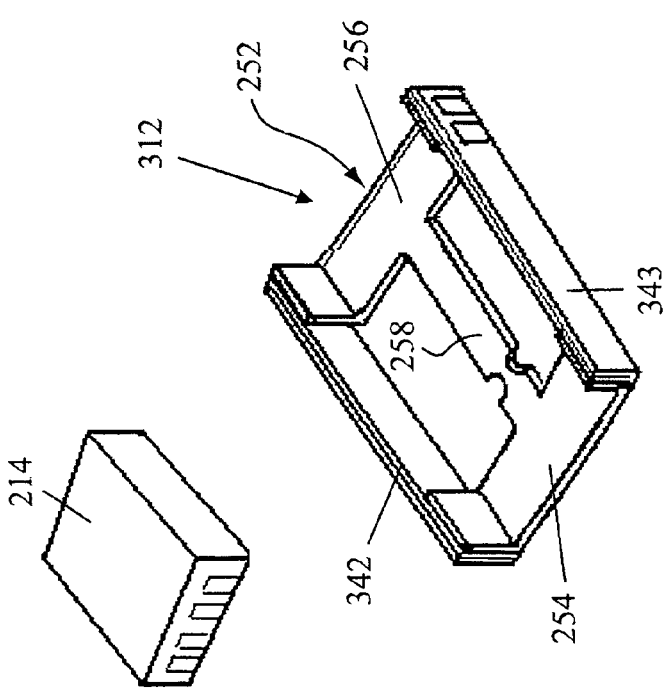
FIG. 17 is an exploded view of a PZT micro-actuator and slider according to another embodiment of the present invention.

FIGS. 17-19 illustrate a PZT micro-actuator 312 according to another exemplary embodiment of the present invention. In this embodiment, the PZT elements 342, 343 of the PZT micro-actuator 312 have a different structure. The remaining components of the PZT micro-actuator 312 are substantially similar to the PZT micro-actuator 212 and indicated with similar reference numerals.

In one embodiment, as shown in FIG. 18, each PZT element 342, 343 may have a multi-layer structure including a substrate layer 392 and a PZT layer 394. The substrate layer 392 may be ceramic, metal, or polymer and the PZT layer 394 may be multi-layer ceramic PZT. The multi-layer PZT includes multiple electrodes 396 and 398 and the PZT crystal are sandwiched between these electrodes. When a voltage is applied to the electrodes 396, 398, the PZT crystal will demonstrate PZT properties and generate movement. In another embodiment, the PZT layer 394 may be single-layer PZT. In yet another embodiment, each PZT element 342, 343 may have a single-layer structure including only have a PZT layer.

In another embodiment, as shown in FIG. 19, each PZT element 342, 343 may have a multi-layer structure including a substrate layer 393 and a PZT layer 395. As illustrated, the PZT layer 395 has a two-layer structure. Each layer of the PZT layer 395 has two electrodes 397 that sandwich a thin-film PZT material 399. The two layers of the PZT layer 395 may be coupled by epoxy. In an embodiment, the substrate layer 393 may be a silicon, MgO, or polymer material. When a voltage is applied to the electrodes 397, the thin-film PZT layers 399 will demonstrate PZT properties and generate movement.

Figure 21:
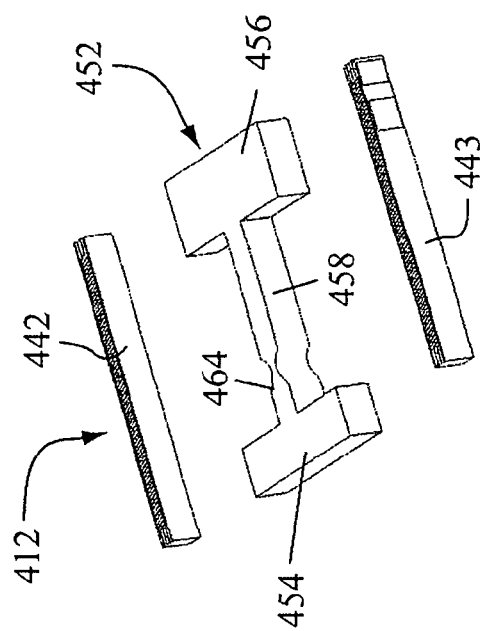
FIG. 21 is an exploded view of the PZT micro-actuator shown in FIG. 20 isolated from the HGA.
Figure 20:
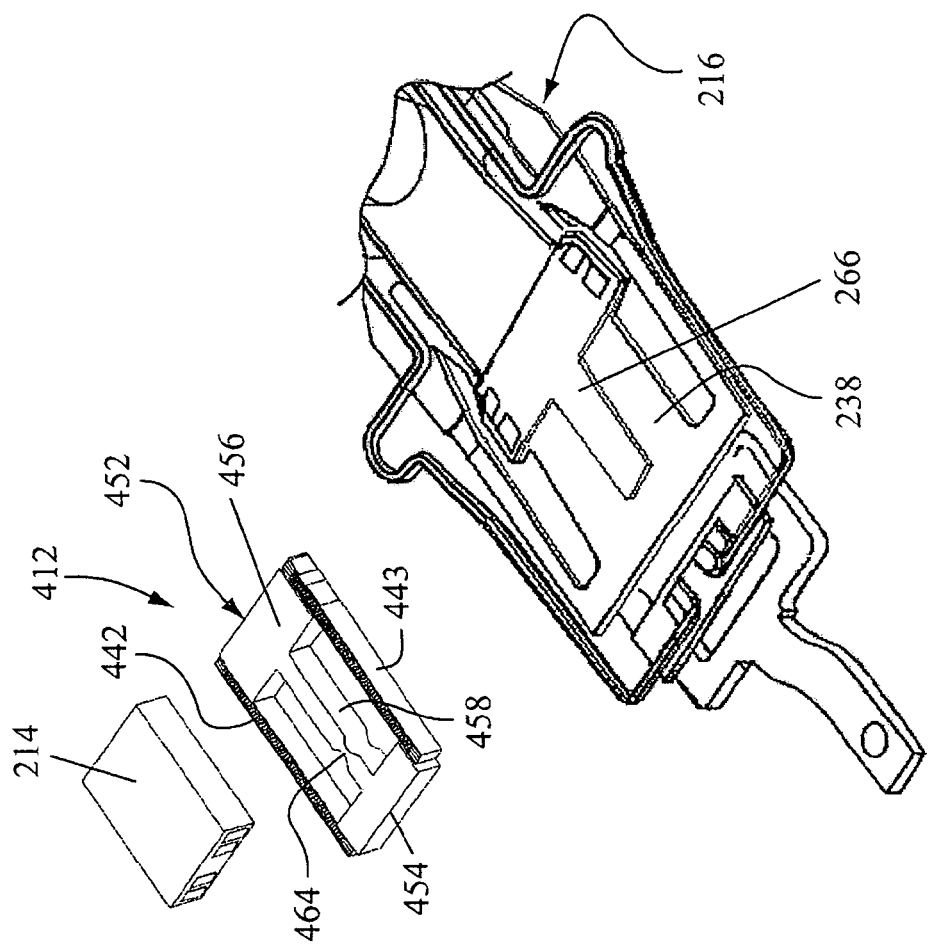
FIG. 20 is an exploded view of a HGA including a PZT micro-actuator according to another embodiment of the present invention.

FIGS. 20 and 21 illustrate a PZT micro-actuator 412 according to another exemplary embodiment of the present invention. In this embodiment, the support frame 452 has a thicker or more bulky construction. As illustrated, the support frame includes a top plate or support 454, a bottom plate or support 456, and a leading beam or connection member 458 that couples the top support 454 to the bottom support 456. Also, weak points or notches 464 are provided in the leading beam 458. The PZT element 442 is mounted between one side of the top and bottom supports 454, 456, and the PZT element 243 is mounted between the other side of the top and bottom supports 454, 456. Similar to the above embodiments, the slider 214 is partially mounted to the top support 454, and the bottom support 456 and a portion of the leading beam 458 are partially mounted on the T-shaped step 266 of the suspension 216. Although structurally different, the PZT micro-actuator 412 has a substantially similar work principle as the PZT micro-actuator 212.

A head gimbal assembly 210 incorporating a PZT micro-actuator 212, 312, 412 according to embodiments of the present invention may be provided to a disk drive device (HDD). The HDD may be of the type described above in connection with FIG. 1. Because the structure, operation and assembly processes of disk drive devices are well known to persons of ordinary skill in the art, further details regarding the disk drive device are not provided herein so as not to obscure the invention. The PZT micro-actuator can be implemented in any suitable disk drive device having a micro-actuator or any other device with a micro-actuator.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A micro-actuator for a head gimbal assembly, comprising:
   a support frame including
     a bottom support adapted to be connected to a suspension of the head gimbal assembly,
     a top support adapted to support a slider of the head gimbal assembly, and
     a leading beam that couples the bottom support and the top support, the leading beam including weak points or notches that allow the top support to rotate about a rotational axis in use; and
   first and second PZT elements, the first PZT element mounted between first sides of the top and bottom supports, and the second PZT element mounted between second sides of the top and bottom supports, the first and second PZT elements being excitable to cause selective rotational movement of the top support about the rotational axis in use;
   wherein the top support includes vertically extending side plates on opposing first and second sides thereof and the bottom support includes vertically extending side plates on opposing first and second sides thereof the side plates of the top and bottom supports structured to support the first and second PZT elements.

2. The micro-actuator according to claim 1, wherein the frame is constructed of metal, ceramic, or polymer.

3. The micro-actuator according to claim 1, wherein the first and second PZT elements are mounted by epoxy bonding, adhesive, or ACF.

4. The micro-actuator according to claim 1, wherein the first and second PZT elements are single-layer thin-film PZT or multi-layer thin-film PZT.

5. The micro-actuator according to claim 1, wherein the first and second PZT elements are single-layer ceramic PZT or multi-layer ceramic PZT.

6. The micro-actuator according to claim 1, wherein each of the first and second PZT elements includes a substrate layer and a PZT layer.

7. The micro-actuator according to claim 6, wherein the PZT layer is a multi-layer PZT including multiple electrodes and PZT crystal sandwiched between the electrodes.

8. The micro-actuator according to claim 1, wherein each of the first and second PZT elements includes a substrate layer and a multi-layer PZT structure.

9. The micro-actuator according to claim 8, wherein each layer of the PZT structure includes two electrodes that sandwich a thin-film PZT material.

10. The micro-actuator according to claim 1, wherein the first and second PZT elements have the same polarization direction.

11. The micro-actuator according to claim 1, wherein the first and second PZT elements have opposite polarization directions.

12. A head gimbal assembly comprising:
a micro-actuator;
a slider; and
a suspension that supports the micro-actuator and the slider,
wherein the micro-actuator includes:
a support frame including
a bottom support connected to the suspension,
a top support that supports the slider, and
a leading beam that couples the bottom support and the top support, the leading beam including weak points or notches that allow the top support to rotate about a rotational axis in use; and
first and second PZT elements, the first PZT element mounted between first sides of the top and bottom supports, and the second PZT element mounted between second sides of the top and bottom supports, the first and second PZT elements being excitable to cause selective rotational movement of the top support about the rotational axis in use;
wherein the top support includes vertically extending side plates on opposing first and second sides thereof and the bottom support includes vertically extending side plates on opposing first and second sides thereof, the side plates of the top and bottom supports structured to support the first and second PZT elements.

13. The head gimbal assembly according to claim 12, wherein the bottom support is connected to a suspension tongue of the suspension.

14. The head gimbal assembly according to claim 13, wherein the suspension tongue includes a T-shaped step constructed of a polymer laminate, and the bottom support and a portion of the leading beam are mounted on the T-shaped step.

15. The head gimbal assembly according to claim 13, wherein a parallel gap is provided between the support frame and suspension tongue.

16. The head gimbal assembly according to claim 13, wherein the suspension includes a load beam, the load beam having a dimple that engages the suspension tongue.

17. The head gimbal assembly according to claim 16, wherein a center of the slider, the weak points, and the dimple are aligned along a common axis.

18. The head gimbal assembly according to claim 12, wherein the slider is partially mounted on the top support by epoxy.

19. The head gimbal assembly according to claim 12, wherein the frame is constructed of metal, ceramic, or polymer.

20. The head gimbal assembly according to claim 12, wherein the first and second PZT elements are mounted by epoxy bonding, adhesive, or ACF.

21. The head gimbal assembly according to claim 12, wherein the first and second PZT elements are single-layer thin-film PZT or multi-layer thin-film PZT.

22. The head gimbal assembly according to claim 12, wherein the first and second PZT elements are single-layer ceramic PZT or multi-layer ceramic PZT.

23. The head gimbal assembly according to claim 12, wherein each of the first and second PZT elements includes a substrate layer and a PZT layer.

24. The head gimbal assembly according to claim 23, wherein the PZT layer is a multi-layer PZT including multiple electrodes and PZT crystal sandwiched between the electrodes.

25. The head gimbal assembly according to claim 12, wherein each of the first and second PZT elements includes a substrate layer and a multi-layer PZT structure.

26. The head gimbal assembly according to claim 25, wherein each layer of the PZT structure includes two electrodes that sandwich a thin-film PZT material.

27. The head gimbal assembly according to claim 12, wherein the first and second PZT elements have the same polarization direction.

28. The head gimbal assembly according to claim 12, wherein the first and second PZT elements have opposite polarization directions.

29. A disk drive device comprising:
a head gimbal assembly including a micro-actuator, a slider, and a suspension that supports the micro-actuator and slider;
a drive arm connected to the head gimbal assembly;
a disk; and
a spindle motor operable to spin the disk,
wherein the micro-actuator includes:
a support frame including
a bottom support connected to the suspension,
a top support that supports the slider, and
a leading beam that couples the bottom support and the top support, the leading beam including weak points or notches that allow the top support to rotate about a rotational axis in use; and
first and second PZT elements, the first PZT element mounted between first sides of the top and bottom supports, and the second PZT element mounted between second sides of the top and bottom supports, the first and second PZT elements being excitable to cause selective rotational movement of the top support about the rotational axis in use;
wherein the top support includes vertically extending side plates on opposing first and second sides thereof and the bottom support includes vertically extending side plates on opposing first and second sides thereof, the side plates of the top and bottom supports structured to support the first and second PZT elements.

30. A head gimbal assembly comprising:
a micro-actuator;
a slider; and
a suspension including a suspension tongue that supports the micro-actuator and the slider,
the micro-actuator includes:
- a support frame including
  - a bottom support connected to the suspension,
  - a top support that supports the slider, and
  - a leading beam that couples the bottom support and the top support, the leading beam including weak points or notches that allow the top support to rotate about a rotational axis in use; and
- first and second PZT elements, the first PZT element mounted between first sides of the top and bottom supports, and the second PZT element mounted between second sides of the top and bottom supports, the first and second PZT elements being excitable to cause selective rotational movement of the top support about the rotational axis in use,
wherein the suspension includes a load beam having a dimple that engages the suspension tongue, and wherein a center of the slider, the weak points, and the dimple are aligned along a common axis, and wherein the top support includes vertically extending side plates on opposing first and second sides thereof and the bottom support includes vertically extending side plates on opposing first and second sides thereof, the side plates of the top and bottom supports structured to support the first and second PZT elements.

31. The head gimbal assembly according to claim 30, wherein the suspension tongue includes a T-shaped step constructed of a polymer laminate, and the bottom support and a portion of the leading beam are mounted on the T-shaped step.

32. The head gimbal assembly according to claim 30, wherein a parallel gap is provided between the support frame and suspension tongue.

* * * * *